United States Patent [19]

Falk

[11] 4,055,957
[45] Nov. 1, 1977

[54] AUTOMOTIVE BRAKE FLUID LOW-LEVEL WARNING SENSOR

[75] Inventor: Edward J. Falk, St. Louis County, Mo.

[73] Assignee: Wagner Electric Corporation, Parsippany, N.J.

[21] Appl. No.: 658,771

[22] Filed: Feb. 17, 1976

[51] Int. Cl.² .............................................. F15B 7/00
[52] U.S. Cl. ..................................... 60/535; 60/545; 60/585; 340/52 C; 340/242
[58] Field of Search ................ 60/534, 535, 545, 585, 60/592; 340/52 C, 242

[56] References Cited

U.S. PATENT DOCUMENTS

| 2,811,600 | 10/1957 | Storck | 60/535 |
| 3,463,554 | 8/1969 | Bueler | 60/534 |
| 3,555,822 | 1/1971 | Rivetti | 60/534 |
| 3,606,487 | 9/1971 | Kersting | 60/535 |
| 3,672,732 | 6/1972 | Green | 60/534 |
| 3,886,746 | 6/1975 | Farr | 60/534 |
| 3,887,899 | 6/1975 | Kawaguchi | 60/534 |

FOREIGN PATENT DOCUMENTS

| 2,235,823 | 1/1975 | France | 60/534 |
| 262,197 | 1932 | Italy | 60/585 |

Primary Examiner—Martin P. Schwadron
Assistant Examiner—Abraham Hershkovitz
Attorney, Agent, or Firm—Eyre, Mann, Lucas & Just

[57] ABSTRACT

In a hydraulic brake system, a housing includes a brake master cylinder and a reservoir formed therein for containing a supply of brake fluid. A sensor piston in contact with the pressure in the brake master cylinder is connected to an indicator piston. The indicator piston is coaxial with a blind cylindrical indicator bore. The blind bore and indicator piston are in communication with the reservoir at a level below which the brake fluid should not be allowed to recede. When the brake is operated, brake master cylinder pressure urges the sensor piston outward. The connected indicator piston is urged toward the blind bore. If the reservoir contains fluid, the blind bore is filled with the fluid. Fluid lock of the indicator piston therefore occurs before any appreciable indicator piston motion into the blind indicator bore. On the other hand, if the reservoir, and the communicating indicator bore, are empty, the indicator piston is enabled to enter the indicator bore by compressing air therein. Motion of the indicator piston into the indicator bore actuates an electrical switch which energizes a warning indicator. Once fully actuated, the electrical switch is mechanically latched in the on position to provide a continued warning indication until it is manually reset after replenishing the brake fluid. In one embodiment of the invention, intermediate brake fluid levels cause the generation of momentary warning signals.

12 Claims, 3 Drawing Figures

AUTOMOTIVE BRAKE FLUID LOW-LEVEL WARNING SENSOR

BACKGROUND OF THE INVENTION

Increasing interest in automotive safety, as well as improving U.S. Federal automotive safety regulations, make evident the need for indication of low hydraulic brake fluid. Fluid level sensors previously used have included a float-activated switch. Others have used various types of electronic sensors. The float-activated switch suffers from the limited gravitational actuation force. The gravity-actuated switch in the corrosive environment created by brake fluid, could become seized beyond the ability of a gravity system to actuate it. The result is a failure in the hazard mode wherein an actual hazard exists but the sensor fails to indicate the hazard. Among the various types of electronic sensors, one type uses a thermistor suspended at the sensing level in the reservoir connected to a small source of electrical power. When the fluid level is above the thermistor, the fluid carries off the small amount of heat dissipated in the thermistor. When the fluid level is below the thermistor, resistance heating in the body of the thermistor causes the thermistor body temperature to rise beyond the highest probable ambient temperature. Thermistors have a very strong negative temperature coefficient of resistivity. As the thermistor temperature increases, the thermistor electrical resistance decreases sharply. External electrical circuits detect the change in resistance and thereupon energize warning devices. Failure in the electronic sensor or its associated circuits can be either in the fail-hazard (actual hazard, safe indication) or in the fail-safe (actual safe, hazard indication) modes.

The prior art fails to disclose a brake fluid level warning indicator positively actuated by brake fluid pressure and which fails in the fail-safe mode.

SUMMARY OF THE INVENTION

The present invention teaches a brake fluid lowlevel warning sensor in which a sensing piston is exposed to the brake fluid pressure generated in the master cylinder when the vehicle brakes are operated. The sensing piston attempts to force a rigidly attached indicator piston into a blind cylindrical indicator bore. The indicator piston and bore are located at an intermediate level in the brake fluid reservoir. If the indicator bore is filled with brake fluid, fluid lock almost immediately stops the motion of the indicator piston into its bore against the pressure applied by the rigidly attached sensing piston. On the other hand, if the indicator bore is completely empty, indicating a dangerously low level of brake fluid, the indicator piston can readily enter its bore under the urging of the sensing piston by compressing air therein. The actuating finger of a spring loaded electrical switch is moved into an alarm position by the motion of the indicator piston. External alarm circuits, triggered by the motion of the switch actuating finger, informs the vehicle operator that the brake fluid is below acceptable levels. In two embodiments of the invention described in later paragraphs, once the alarm circuits are triggered, the system latches into the alarm position; thereby sustaining the alarm position until the brake fluid reservoir is replenished and the actuating finger is manually reset. In a third alternative embodiment of the invention, an intermediate level brake fluid causes the warning sensor to generate a momentary, automatically reset, warning signal each time the brake system is actuated while the brake fluid is moderately depleted. If the operator ignores the momentary warning signals, and if enough additional brake fluid is lost from the system to cause depletion to a dangerous level, a condition is attained in which a latched alarm signal is generated. In this condition, the alarm signal requires manual reset after replenishing the brake fluid in the reservoir.

DETAILED DESCRIPTION OF THE PREFERRED EMBODIMENT

Figure 1:
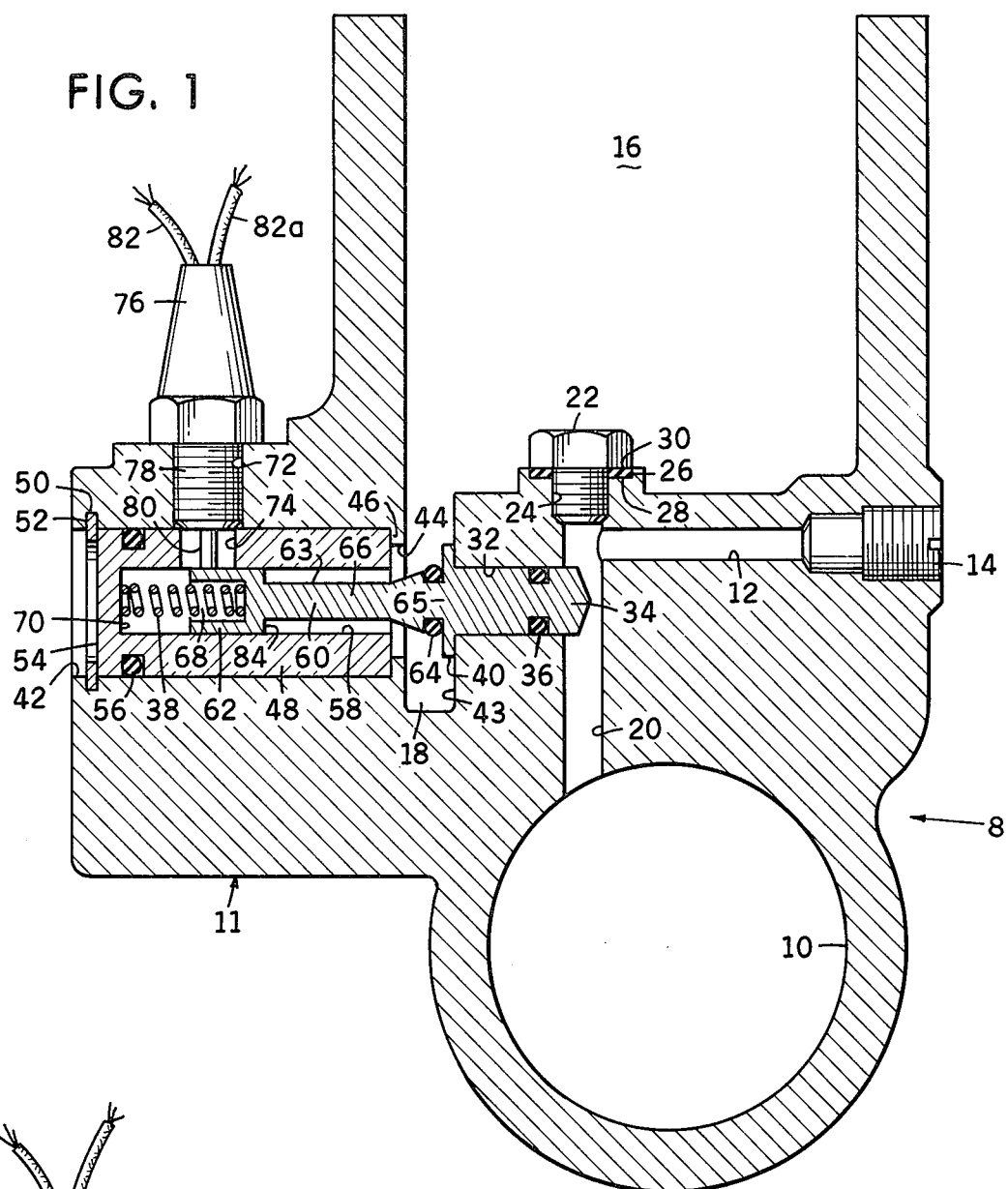
FIG. 1 shows a cross-sectional view of a first embodiment of the invention in which the switch actuator is immersed in the brake fluid.

Referring to the cross-sectional view of the first embodiment of the brake master cylinder shown generally at 8 in FIG. 1, housing 11 includes the bore of a brake master cylinder 10 formed therein and connected to a pressure outlet passage 12 and a threaded female pressure output connector 14 via sensing passage 20. Brake fluid pressure is normally communicated from the pressure output connector 14 to the vehicle brakes. A brake fluid reservoir 16 contains a supply of brake fluid at approximately atmospheric pressure.

It is the function of the present invention to provide an alarm indication when the fluid in the brake fluid reservoir 16 has been depleted past an alarm level. The alarm level is established such that the alarm signal occurs well before brake fluid starvation could occur.

Sensing passage 20 extends upward from bore 10. The upper end of the sensing passage 20 is sealed with an outside threaded screw 22 in cooperating engagement with inside threads 24 in the upper end of the sensing passage 20. A fluid-tight seal is achieved at the top of the sensing passage 20 by a resilient gasket 26 compressed between the opposing surfaces of the top 28 of the sensing passages 20 and the bottom of the head 30 of the screw 22. The brake fluid reservoir 16 contains a channel 18 in open communication with the brake fluid reservoir 16. The brake fluid in channel 18 is at the same level as in the reservoir 16. A cylindrical sensing bore 32 provides communication between the sensing passage 20 and the channel 18. A sensing piston 34 occupies the sensing bore 32. A resilient piston ring 36 provides a fluid-tight seal between the sensing piston 34 and the sensing bore 32. An indicator piston 65 is connected to the sensing piston 34. In the embodiment shown, the indicator piston 65 and sensing piston 34 are coaxial. Offset axes of the two pistons and their associated cylinders are equally possible. A blind cylindrical indicator bore 58 is disposed coaxially with the indicator piston 65. In the quiescent or normal brakes off condition shown in the figures, the indicator piston ring 64 on the indicator piston 65 remains outside the indicator bore 58.

A cylindrical bore 42, coaxial with and containing the indicator bore 58 is located on the opposite side of the channel 18 from the sensing bore 32. At its inner end, the diameter of the cylindrical bore 42 is stepped down to form a smaller diameter opening 44. The stepped-down bore forms an annular shoulder 46. The cylindrical bore 42 is occupied by a cylindrical bushing 48 whose inner end bears against the annular shoulder 46. An annular groove 50, adapted to accommodate retainer ring 52 is located within the cylindrical bore 42 at approximately the outer end 54 of the cylindrical bushing 48. The ring 52 provides a removable annular shoulder to retain the cylindrical bushing 48 within the cylindrical bore 42. A resilient seal 56 prevents brake fluid leakage between the cylindrical bore 42 and cylindrical bushing 48.

A switch-actuating member 60, having a stepped transition from large diameter 62 to small diameter 63 normally occupies the indicator bore 58. The switch-actuating member 60 forms the outboard end of the sensing piston 34. In the absence of pressure in the brake master cylinder 10 and communicated pressure in the sensing passage 20, a relatively weak return spring 38, partially enclosed within a coaxial hole 68 in the end of the large diameter portion 62 of the switch actuating member 60 bears on the inner end of the coaxial hole 68 and the inner surface 70 of the closed end of the cylindrical bushing 48. The nominal pressure of the return spring 38 urges the sensing piston 34 toward the sensing passage 20. An annular shoulder 40 on the sensing piston 34 limits the inward travel of the sensing piston 34 by providing interference with the wall 43 of the channel. An indicator piston ring 64, mounted on the shaft 66 connecting the switch actuating member 60 to the sensing piston 34, is normally disengaged from the indicator bore 58.

A threaded transverse bore 72 through the outer housing and a matching bore 74 through the cylindrical bushing 48 provides access to the switch actuating member 60. A sealed spring-loaded switch 76 having a threaded barrel 78 is sealably installed in the threaded transverse bore 72. A switch actuating finger 80 extends from the end of the threaded barrel 78 and bears upon the switch actuating member 60. The switch actuating finger 80 is spring loaded in the outward direction in order that firm contact with the switch actuating member 60 is maintained at all times. Signal wires 82, 82a connect electrical signals from the sealed spring-loaded switch 76 to external warning circuits.

Each time the brake pedal (not shown) is depressed, brake fluid pressure in the brake master cylinder 10 is communicated through the pressure outlet passage 12 and the sensing passage 20 to the face of the sensing piston 34. The brake fluid pressure urges the sensing piston 34 outward. After a short travel of the sensing piston 34, the rigidly connected indicator piston ring 64 begins to engage the indicator bore 58. If the fluid level in the brake fluid reservoir 16 and the communicating channel 18 is above the top of the indicator bore 58, the indicator bore 58 is filled with incompressible brake fluid. Consequently, when the indicator piston ring 64 attempts to enter the indicator bore 58, it is almost immediately stopped by fluid lock. On the other hand, if the fluid level is below the indicator bore 58, the cylinder bore 42 contains compressible air. Consequently, continued urging by the sensing piston 34 causes the indicator piston ring 64 to continue entering the indicator bore 58, compressing the air therein. The switch actuating member 60 is also moved in concert with the sensing piston 34. If the switch actuating member 60 is moved far enough that the switch actuating finger 80 is no longer in contact with the large diameter 62 of the switch actuating member, the spring loading of the switch actuating finger 80 causes it to move downwardly into the recess at the small diameter 63 of the switch actuating member 60. This permits internal contact in switch 76 from a normally open to a closed position thus energizing a warning indicator. The signal wires 82, 82a make the change of contact condition available to external circuits.

The transition from large diameter 62 to small diameter 63 is a step 84. Once the switch actuating finger 80 has dropped down into the recess at small diameter 63, the side of the switch actuating finger 80 provides interference with the sharp step 84 thereby preventing the return of the pistons into their normal positions. Consequently, once an alarm level has been first attained, the device remains latched in the alarm condition.

To unlatch the switch 76, the reservoir 16 is filled with fluid; then the switch 76 is loosened by backing out the threaded barrel 78 until the switch actuating finger 80 clears the large diameter 62. The pistons are thereupon urged into their non-alarm position by the return spring 38. During the loosening of the threaded barrel 78, any air trapped in the cylindrical bore 42 or matching bore 74 is enabled to slowly escape. A small amount of brake fluid may also escape during this operation, but since the brake fluid at this point is under only a small static head, the amount lost is negligible.

Figure 2:
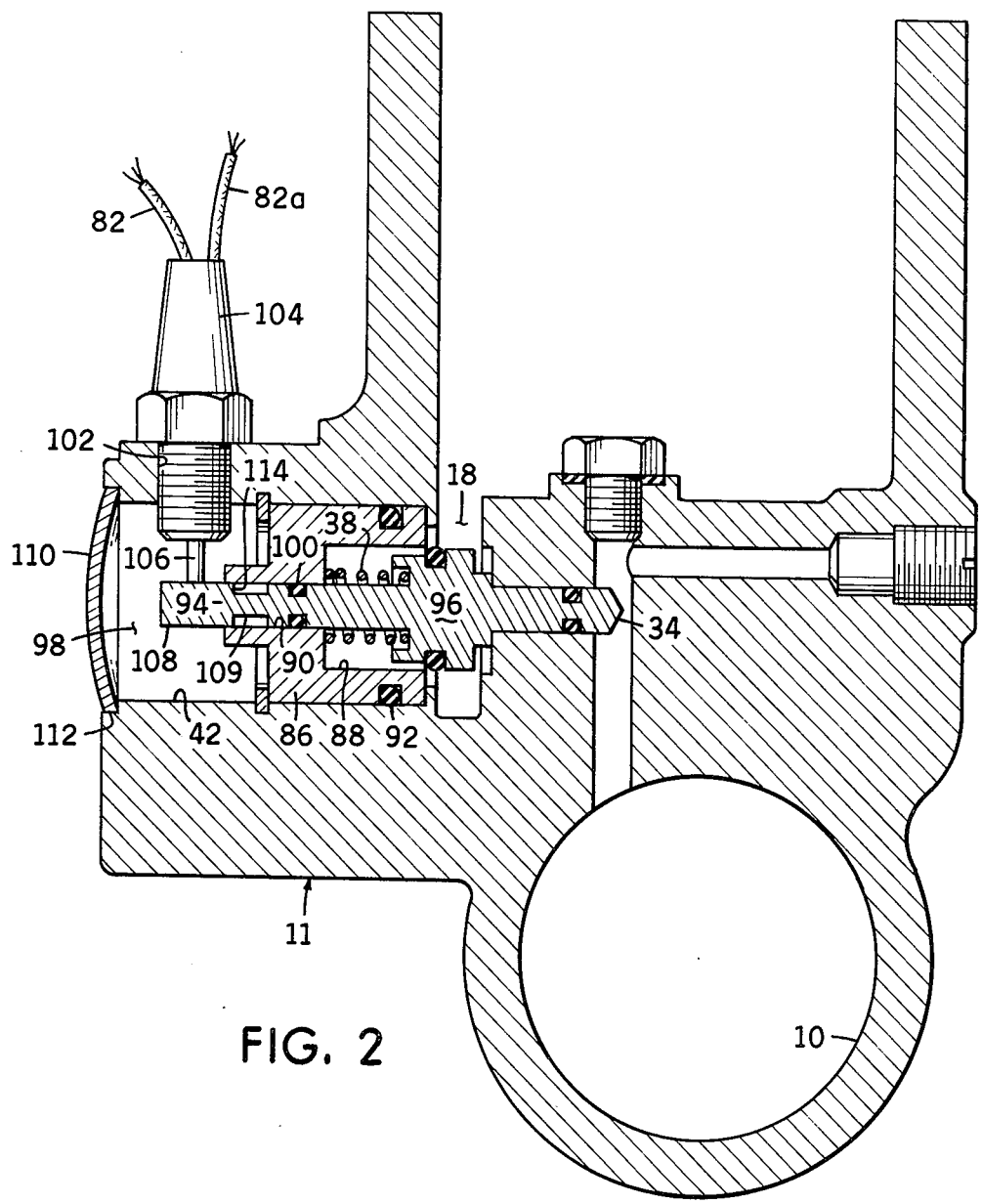
FIG. 2 shows a cross-sectional view of a second embodiment of the invention in which the switch actuator is isolated from the brake fluid.

An alternative embodiment of the invention is shown in FIG. 2. The general method of sensing and indicating is the same in the embodiment shown in FIG. 2 as in the embodiment previously described with reference to FIG. 1. Generally, the embodiment of FIG. 2 changes the position of the switch and its actuating member to an outer chamber which is isolated from the brake fluid. This has the advantage of eliminating the corrosive effects of brake fluid on the switch, eliminating the need for a fluid-tight sealed switch, and making external reset more convenient. Only the parts of the embodiment of FIG. 2 which are different from the embodiment shown in FIG. 1 will be described in detail in the following.

A cylindrical bore 42 communicates between the exterior and the channel 18. A cylindrical bushing 86 containing a coaxial indicator bore 88 at one end and a communicating bore 90 at the other end occupies the cylindrical bore 42. Resilient seal 92 provides a leak-tight seal between the cylindrical bushing 86 and the cylindrical bore 42. A cylindrical switch actuating member 94, connected to the indicator piston 96 and the sensing piston 34, extends outward through the communicating bore 90 into an outer chamber 98. A resilient seal 100 provides a leak-tight seal between the shaft of the switch actuating member 94 and the communicating bore 90. The switch actuating member 94 has larger diameter 108 and smaller diameter 109 portions. The transition between the larger diameter 108 and the smaller diameter 109 is a sharp step 114 with the sides of the sharp step being normal to the axis of the switch actuating member 94.

A threaded transverse bore 102 communicates through the body of the assembly into the outer chamber 98. An unsealed spring-loaded switch 104 is threadably installed into the threaded transverse bore 102. A spring-loaded switch actuating finger 106 extends downward from the spring-loaded switch 104 into the outer chamber. Outward motion of the switch actuating finger 106 is stopped by interference between it and the larger diameter 108 of the switch actuating member 94.

A sealing plug 110 is installed in an annular notch 112 in the outer end of the outer chamber 98 in order to exclude dirt and moisture from the outer chamber 98.

When brake fluid pressure in the master cylinder 10 urges the sensing piston 34 outward, as previously described, the indicator piston 96 attempts to enter the indicator bore 88. If the indicator bore 88 is filled with fluid, fluid lock almost immediately prevents such entry. This occurs well before the smaller diameter 109 is moved fully under the switch actuating finger 106. Consequently, the amount of extension of the switch actuating finger 106 is not changed. No change in the external electrical signal is generated. When the brake cylinder pressure is released, the sensing piston 34 is returned to its quiescent position by the urging of return spring 38.

If the brake fluid level is below the indicator bore 88, the indicator piston 96 is enabled to enter the indicator bore 88 by compressing the air therein. If the actuating pressure is great enough, the switch actuating member 94 is moved far enough so that the smaller diameter 109 is moved fully under the switch actuating finger 106. The switch actuating finger 106 is thereupon urged downwardly into the recess at the smaller diameter 109. The internal contacts of the switch 104 reverse their normally open to a closed condition and thereby provides an electrical alarm signal to external alarm circuits. Once the switch actuating finger 106 has dropped into the recess at smaller diameter 109, interference between the step 114 and the side of the switch actuating finger 106 prevents the return of the moving assembly into the quiescent position. Consequently, once the alarm signal is generated, it remains latched in the alarm condition until the brake fluid is replenished and the switch actuating finger 106 is manually retracted. The switch actuating finger 106 may be retracted either by partially unscrewing the switch 104 until the switch actuating member 94 is released or by removing the sealing plug 110 and manually retracting the switch actuating finger 106 to release the switch actuating member 94. When the switch actuating member 94 is released in one of these ways, the alarm signal generated by the spring-loaded switch 104 is reset and the sensing piston 34 is enabled to return to its quiescent position.

Figure 3:
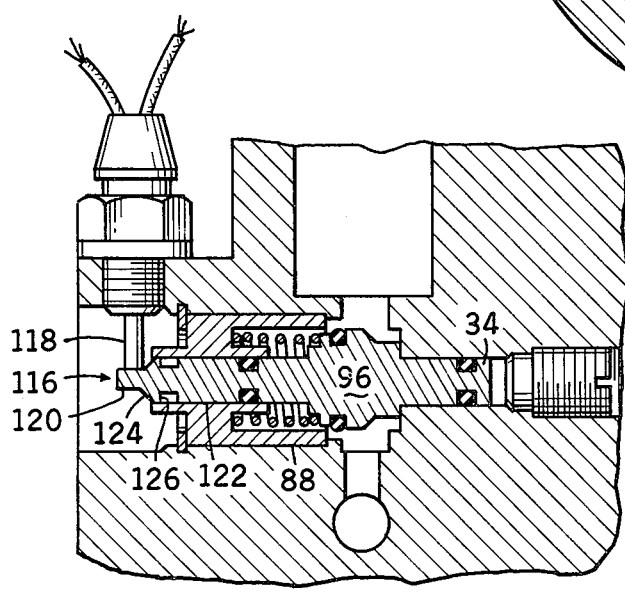
FIG. 3 shows a cross-sectional view of a third embodiment containing a switch and actuator operating on the push-up principle.

The switches in both of the preceding embodiments have been arranged in a drop-down configuration. That is, the alarm signals are generated by extension of the spring-loaded actuating fingers. In certain applications, a push-up switch configuration, in which the alarm is generated by the switch actuating finger being pushed into the switch, is more desirable. FIG. 3 shows a push-up switch actuating member 116 which could be substituted for the switch actuating member 60 in FIG. 1 or the switch actuating member 94 in FIG. 2. The spring-loaded switch actuating finger 118 normally rests upon the smaller diameter 120 portion of the switch actuating member 116 in the quiescent state. The smaller diameter 120 is connected to a large diameter 122 portion by a conical ramp 124. The maximum diameter of the conical ramp 124 exceeds the maximum diameter of the larger diameter 122. The conical ramp 124 is joined to the larger diameter by lip 126. The push-up switch actuating member 116 is connected to, and operates with, the indicator and sensing pistons 96, 34 in a manner identical to that described with reference to FIGS. 1 and 2. The push-up configuration allows two modes of operation:

a. momentary warning signals generated when the brake fluid level depletion is not so serious as to require an alarm and;

b. latching alarm signals generated when the brake fluid level is low enough to require immediate attention.

The momentary warning signal is generated while the fluid level in the brake fluid reservoir 16 remains above the bottom but below the top of the indicator bore 88. This brake fluid level is low enough to require a warning signal but not low enough to require a latched alarm signal. As the switch actuating member 116 is moved leftward under the urging of brake fluid pressure, the switch actuating finger 118 rides up the conical ramp 124. At some intermediate level on the concial ramp 124, the switch actuating finger 118 is pressed far enough upward to cause the switch 104 to generate a momentary warning signal. Since the switch actuating member 116 does not become latched in this mode, release of the brake pressure allows the switch actuating member 116 to return to its quiescent non-warning position. Thus, the vehicle operator is alerted to the need for adding brake fluid by a momentary self-resetting warning signal each time the brakes are applied. If the warning signal is ignored while additional brake fluid is lost from the system, eventually the switch actuating member 116 is enabled to travel far enough to the left that the end of the switch actuating finger 118 drops over the lip 126 and comes to rest against the larger diameter 122. Thereafter, interference between the side of the switch actuating finger 118 and the side of the lip 126 latches the switch actuating member 116 in the alarm position. The alarm signal thereby generated persists until the brake fluid is replenished and the system manually reset in the manner previously described.

What is claimed is:

1. In a hydraulic brake system which includes a housing having a brake master cylinder, means for pressurizing said master cylinder; and a reservoir formed therein for containing a supply of brake fluid said reservoir having a bottom, the depleted fluid in said reservoir being replaced by atmospheric air, a low brake fluid warning sensor comprising:
  a. a first piston;
  b. means for translation of said first piston by brake fluid hydraulic pressure each time said means for pressurizing causes hydraulic pressure to exist in said master cylinder;
  c. a second piston;
  d. means for corresponding translation of said second piston with the first piston, said second piston being located at a predetermined height above the bottom of said reservoir;
  e. the housing including a blind bore in said reservoir in coaxial alignment with said second piston means, said blind bore becoming filled with brake fluid from said reservoir when the level of said brake fluid is above the level of said blind bore and becoming filled with atmospheric air when the level is below said blind bore, said second piston being located outside said blind bore when there is no fluid pressure in said master cylinder, said translation moving said second piston toward and at least partly into said blind bore, said blind bore being filled with fluid almost immediately to stop the entry of said second piston means and thereby halting further translation of said first and second pistons, said second piston means being enabled to enter said blind bore by compressing the air therein when said brake fluid level is below said second piston; and f. means for generating an electrical signal when said second piston enters said blind bore.

2. A warning sensor as recited in claim 1, wherein said means for generating an electrical signal comprises:
   a. an electrical switch;
   b. a spring-loaded switch actuating finger protruding from said switch, said spring-loaded finger changing the electrical contact condition of said spring-load switch when said spring-loaded finger is moved relative to said switch;
   c. a switch actuating member connected to said first and second pistons and moving therewith;
   d. bearing point means on said switch actuating member upon which the end of said spring-loaded switch actuating finger presses in the quiescent, non-warning condition; and
   e. switch actuating means on said switch actuating member, said switch actuating means being effective to move said switch actuating finger relative to said switch, when said blind bore is empty of brake fluid, whereby said change in electrical contact condition of said switch is caused to occur.

3. A warning sensor as recited in claim 2 wherein said spring loaded switch is in contact with said brake fluid.

4. A warning sensor as recited in claim 2 wherein said spring loaded spring is isolated from contact with said brake fluid.

5. A warning sensor as recited in claim 2 wherein actuation of said electrical switch is effected by said spring-loaded switch actuating finger being moved into said switch by said switch actuating means.

6. A warning sensor as recited in claim 2 wherein actuation of said electrical switch is effected by said spring-loaded switch actuating finger being moved outward from said switch by said switch actuating means.

7. A warning sensor as recited in claim 1 wherein said generating means contains means for latching said warning sensor into providing a continuing warning signal after once being actuated, said warning signal being continued until manually reset.

8. A warning sensor as recited in claim 1 wherein said generating means further comprises:
   a. means for generating a momentary, non-latching, warning signal when said brake fluid is between the bottom and top of said blind bore; and
   b. means for generating a permanent, latched, warning signal when said brake fluid level is below the bottom of said blind bore.

9. A warning sensor for a hydraulic brake system including a housing having a master brake cylinder with brake fluid therein and a reservoir containing a supply of brake fluid comprising:
   a. a first piston having one end thereof in communication with the brake fluid of said master cylinder to apply a force against said one end of the first piston causing translation of said first piston when the master cylinder is actuated;
   b. a second piston having one end thereof connected to the second end of said first piston;
   c. the housing including a blind bore formed therein coaxially aligned with the second end of said second piston;
   d. said second piston being located outside said blind bore and being translated toward and at least partly into said blind bore by translation of said first piston;
   e. means for supplying brake fluid from said reservoir to said blind bore to oppose movement of the second end of said second piston into said blind bore upon actuation of the master cylinder; and
   f. means for generating an electrical signal when said second piston enters said blind bore.

10. The warning sensor of claim 9 wherein the electricl signal generating means includes a warning signaling device which is actuated by said second piston when there is insufficient fluid in said blind bore to prevent movement of said pistons.

11. A warning sensor for a hydraulic brake system which comprises:
   a. a housing;
   b. a master brake cylinder formed in the housing;
   c. a reservoir formed in the housing for supplying brake fluid to said master cylinder said reservoir having a bottom;
   d. a first piston;
   e. a port providing open communication between one end of said first piston and the master cylinder, said first piston being translated by fluid pressure in said master cylinder;
   f. a second piston having one end connected to the second end of said first piston and free to translate therewith;
   g. the housing including a blind bore formed therein coaxially aligned with the second end of said second piston;
   h. said seond piston being located outside said blind bore and being translated toward and at least partly into said blind bore when translated;
   i. a second port providing open communication between said blind bore and said reservoir to oppose translation of said second piston into said blind bore;
   i. said blind bore being located at a level below the normal brake fluid level and above the level of the bottom of the brake fluid reservoir; and
   k. means for generating an electrical signal when said second piston enters said blind bore.

12. The warning sensor of claim 11 wherein the electrical signal generating means includes a warning signal device which is actuated by movement of said pistons.

* * * * *